(12) United States Patent
Lee et al.

(10) Patent No.: US 12,620,663 B2
(45) Date of Patent: May 5, 2026

(54) BATTERY PACK MOUNTING STRUCTURE FOR VEHICLE

(71) Applicants: Hyundai Motor Company, Seoul (KR); Kia Corporation, Seoul (KR)

(72) Inventors: Won Hae Lee, Seoul (KR); Nam Ho Kim, Gwangmyeong-si (KR); Dae Ki Jeong, Hwaseong-si (KR); Su Jin Lee, Seoul (KR); Jun Woo Park, Hwaseong-si (KR); Jeong Hoon Han, Incheon (KR); Eun Bi Kim, Seoul (KR); Sun Keun Park, Seoul (KR); Byung Joo Chung, Gunpo-si (KR); Seung Hak Lee, Asan-si (KR); Seung Min Jeong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 483 days.

(21) Appl. No.: 18/195,487

(22) Filed: May 10, 2023

(65) Prior Publication Data

US 2024/0186635 A1     Jun. 6, 2024

(30) Foreign Application Priority Data

Dec. 5, 2022     (KR) ........................ 10-2022-0167906

(51) Int. Cl.
*B60K 1/04*     (2019.01)
*B60R 16/04*     (2006.01)
*H01M 50/244*     (2021.01)
*H01M 50/249*     (2021.01)

(52) U.S. Cl.
CPC ........... *H01M 50/249* (2021.01); *B60R 16/04* (2013.01); *H01M 50/244* (2021.01); *H01M 2220/20* (2013.01)

(58) Field of Classification Search
CPC .... B60K 1/04; H01M 50/244; H01M 50/246; H01M 50/249
See application file for complete search history.

(56) References Cited

U.S. PATENT DOCUMENTS 11,955,650 B2 *  4/2024  An ..................... B62D 25/2036
2019/0359260 A1 * 11/2019  Tsuyuzaki ........... H01M 50/249

FOREIGN PATENT DOCUMENTS

KR     10-2014-0045778 A     4/2014

* cited by examiner

*Primary Examiner* — Marc Q Jimenez
*Assistant Examiner* — James J Triggs
(74) *Attorney, Agent, or Firm* — Morgan, Lewis & Bockius LLP

(57) ABSTRACT

The present disclosure includes a frame side member forming a chassis frame and disposed on both sides of a vehicle in a forward-backward direction, a battery disposed to overlap inwardly from the frame side member in a horizontal direction, and a battery case surrounding the battery and coupled to the frame side member, wherein a cross section of the frame side member forms a plurality of closed spaces.

18 Claims, 6 Drawing Sheets

1

BATTERY PACK MOUNTING STRUCTURE FOR VEHICLE

CROSS REFERENCE TO RELATED APPLICATION

Figure 1:
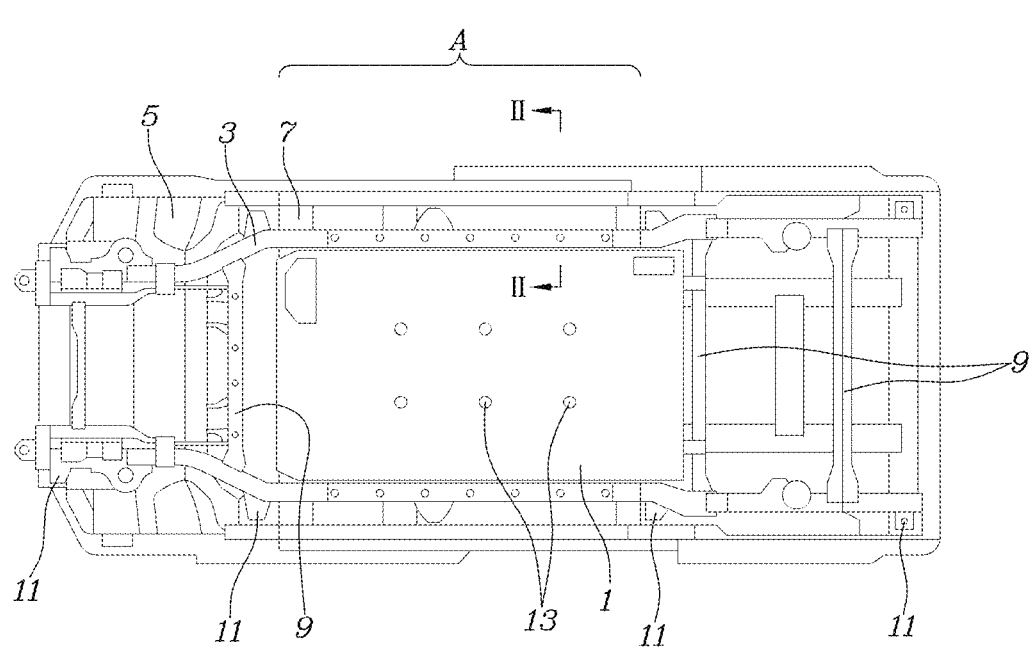

The present application claims priority to Korean Patent Application No. 10-2022-0167906 filed on Dec. 5, 2022, the entire contents of which is incorporated herein for all purposes by this reference.

BACKGROUND OF THE PRESENT DISCLOSURE

Field of the Present Disclosure

The present disclosure relates to a technology for mounting a battery pack required for an electric vehicle or the like on a vehicle.

Description of Related Art

A vehicle with a BODY ON FRAME structure means a vehicle having a structure in which a vehicle body is mounted on an upper side of a chassis frame, in particular, using chassis frames with chassis components required to drive the vehicle for common use, and considering to be easily mounted by changing the vehicle body mounted on an upper side thereof into various states desired by a customer.

When an electric vehicle has the BODY ON FRAME structure as described above, a battery pack is preferably provided on the chassis frame side.

The battery pack generally includes a battery module including battery cells, and a battery case surrounding, protecting, and supporting a plurality of battery modules.

Hereinafter, simply 'battery' refers to a battery cell or a battery module in the battery case.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery pack mounting structure for a vehicle to effectively protect a battery required for driving a vehicle, while ensuring an ease of getting on or off of a passenger and maximizing a space in the passenger's room in a vehicle with a BODY ON FRAME structure, securing safety of a mounted battery and greatly increasing a commercial property of the vehicle.

The battery pack mounting structure for a vehicle according to an exemplary embodiment of the present disclosure to achieve the above object includes a frame side member forming a chassis frame and disposed to extend over a long distance on both sides of a vehicle in a forward-backward direction, a battery disposed to overlap inwardly from the frame side member in a horizontal direction, and a battery case surrounding the battery and coupled to the frame side member, wherein a cross-section of the frame side member forms a plurality of closed spaces.

The frame side member may have a frame reinforcement panel therein to form the plurality of closed spaces, and a locker to which a case mounting bolt for coupling the battery case to the frame side member is fastened may be provided to be supported by the frame reinforcement panel.

The frame reinforcement panel may be provided inside the frame side member to form a bulkhead in a horizontal direction, and the locker may be provided in a state of passing through the frame reinforcement panel to extend over a long distance vertically so that the case mounting bolt fastened to pass through from a lower side of the frame side member is coupled to the locker in a bolt-and-nut fastening manner.

The locker may be disposed at the center portion of the cross-section of the frame side member.

The locker may be provided so that a length of a portion thereof which is coupled to the case mounting bolt in a bolt-and-nut manner is 9 mm or more than 9 mm.

The battery case may include an upper cover surrounding an upper side of the battery, a case lower plate supporting a lower side of the battery, and a case side unit provided between the upper cover and the case lower plate to form a side surface of the battery case, wherein the case side unit may include a vertical cross-section unit is between the upper cover surrounding the upper side of the battery and the case lower plate supporting the lower side of the battery and coupled to form a side surface of the battery case as a long cross-section in the vertical direction, and a horizontal cross-section unit protruding in a predetermined distance in a transverse direction of the vehicle from the vertical cross-section unit and coupled to the lower side of the frame side member.

The horizontal cross-section unit may be provided with a sleeve contacting with the lower side of the frame side member, and the case mounting bolt may pass through a sleeve of the horizontal cross-section unit and may fasten to the locker of the frame side member.

The plurality of bulkheads may be formed in the vertical cross-section unit of the case side unit to divide inside of the vertical cross-section unit into a plurality of closed spaces.

The plurality of bulkheads provided in the vertical cross-section may be spaced from each other in the vertical direction and parallel to each other, and one of the bulkheads may be disposed to be aligned on a same horizontal plane as a frame reinforcement panel of the frame side member.

A vehicle body side chamber may be disposed outside the frame side member, a side chamber reinforcement panel may be provided to form at least one closed space inside a cross-section of the vehicle body side chamber, and at least some of portions where the side chamber reinforcement panel is horizontally disposed may be disposed to be aligned on the same horizontal plane as the frame reinforcement panel of the frame side member.

Furthermore, a battery pack mounting structure for a vehicle includes the frame side member forming the chassis frame and disposed to extend over a long distance on both sides of a vehicle in the forward-backward direction, the battery disposed to overlap inwardly from the frame side member in a horizontal direction, and the case side unit coupled to the lower side of the frame side member and including an "L" shaped cross-section when viewed on the side surface of the battery case surrounding the battery, wherein the frame reinforcement panel forming a bulkhead in the horizontal direction is provided inside the frame side member.

The frame side member may include a closed cross-section with an upper horizontal unit and a lower horizontal unit parallel to upper and lower sides of the frame reinforcement panel, respectively.

The lower horizontal unit and the frame reinforcement panel may support with a locker coupled in a bolt-and-nut manner to the case mounting bolt fastened through the case side unit.

The locker may have a lower flange coupled to an upper side of the lower horizontal unit of the frame side member, and an upper side of the locker may be fixed by passing through the frame reinforcement panel.

The locker may be disposed at the center portion of the cross-section of the frame side member.

The case side unit may configure to include the vertical cross-section unit is between the upper cover surrounding the upper side of the battery and the case lower plate supporting the lower side of the battery, and coupled to form the side surface of the battery case as a long cross-section in the vertical direction, and the horizontal cross-section unit protruding over a long distance in a transverse direction of the vehicle from the vertical cross-section unit and coupled to the frame side member.

The vertical cross-section unit may be provided with the plurality of bulkheads spaced from each other in the vertical direction, and one of the bulkheads may be disposed to be aligned on the same horizontal plane as the frame reinforcement panel of the frame side member.

The vehicle body side chamber may be disposed outside the frame side member, the side chamber reinforcement panel is provided inside the cross-section of the vehicle body side chamber, and at least some of portions where the side chamber reinforcement panel is horizontally disposed may dispose to be aligned on the same horizontal plane as one of the frame reinforcement panel of the frame side member and the bulkhead of the vertical cross-section unit.

The present disclosure effectively protects a battery required for driving a vehicle, while ensuring an ease of getting on or off of a passenger and maximizing a space in the passenger's room in a vehicle with a BODY ON FRAME structure, securing safety of a mounted battery and greatly increasing a commercial property of a vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 illustrates an example in which a battery pack mounting structure for a vehicle according to an exemplary embodiment of the present disclosure is applied, and is a view exemplarily illustrating a state in which a chassis frame and a battery are mounted on a lower side of a vehicle body.

FIG. 2 is a cross-sectional view taken along line II-II of FIG. 1, which illustrates a horizontal arrangement relationship of components.

FIG. 3 is a cross-sectional view taken along line II-II of FIG. 1, which illustrates a vertical arrangement relationship of components.

FIG. 4 is a view of portion A of FIG. 1 observed from a side direction thereof.

FIG. 5 is a cross-sectional view taken along line II-II of FIG. 1, which illustrates a structure of a battery case.

FIG. 6 is a cross-sectional view taken along line II-II of FIG. 1, which illustrates a structure of a frame side member.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE PRESENT DISCLOSURE

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings. However, regardless of the reference character, the same or similar constituent elements shall be provided the same reference numeral and the redundant descriptions thereof shall be omitted.

The suffix "module" and "unit" for the constituent elements used in the description below are provided or mixed only in consideration of the ease of writing the specification, and do not have any distinctive meaning or role in itself each other.

In describing the exemplary embodiments of the present specification, when a specific description of the related art is deemed to obscure the subject matter of the exemplary embodiments of the present specification, the detailed description will be omitted. Furthermore, the accompanying drawings are intended to facilitate the understanding of the exemplary embodiments set forth in the present specification, and the technical idea of the present specification is not limited by the accompanying drawings. All alterations, equivalents, and substitutes that are included within the technical idea of the present disclosure should be understood as falling within the scope of the present disclosure.

The ordinal number terms first, second, and the like may be used to describe various constituent elements but should not limit these constituent elements. These terms are only used to distinguish one constituent element from another element.

It should be understood that a constituent element, when referred to as being "connected to" or "coupled to" another constituent element, may be directly connected or directly coupled to the another constituent element or may be coupled or connected to the another constituent element with a third constituent element disposed therebetween. In contrast, it should be understood that a constituent element, when referred to as being "directly coupled to" or "directly connected to" another constituent element, is coupled or connected to the another constituent element without a third constituent element therebetween.

A noun in singular form has the same meaning as nouns when used in plural form, unless it has a different meaning in context.

It should be understood that, throughout the present specification, the term "include," "have," or the like is directed to indicate that a feature, a number, a step, an operation, a constituent element, a component, or a combination thereof is present, without precluding the possibility that one or more other features, numbers, steps, operations, constituent elements, components, or a combination thereof will be present or added.

FIG. 1 illustrates an example in which a mounting structure of a battery pack 1 for a vehicle according to an exemplary embodiment of the present disclosure is applied, and is a view observed from a lower side of a vehicle in a state in which a vehicle body 5 is coupled to an upper side of a chassis frame 3 and the battery pack 1 is mounted on the chassis frame 3 at the center portion of the vehicle body 5.

The chassis frame 3 includes frame side members 7 disposed to extend over a long distance in the forward-backward direction on both sides of the vehicle, and a plurality of frame cross members 9 connecting the two frame side members 7 in a transverse direction of the vehicle.

The vehicle body 5 is located in an upper side of the chassis frame 3, and the chassis frame 3 and the vehicle body 5 are coupled through a plurality of vehicle body mounting units 11 as illustrated.

The vehicle body 5 mounted on the upper side of the chassis frame 3 may be configured in various forms to meet needs of consumers.

As described below, both sides of the battery pack 1 are coupled to a frame side member 7 of the chassis frame 3, in addition, the battery pack 1 may be securely coupled to the vehicle body 5 by a plurality of battery pass through bolts 13 coupled to the vehicle body 5 through a center portion of the battery pack 1.

Hereinafter, the battery pack mounting structure of the present disclosure will be mentioned relates to section A of FIG. 1.

For reference, hereinafter, the battery pack mounting structure for a vehicle of the present disclosure will be sequentially described that a part mainly described by paying attention to a horizontal arrangement relationship of components, a part mainly described by paying attention to a vertical arrangement relationship of components, a part mainly described by paying attention to a structure of a battery case, and a part mainly described by paying attention to a structure of a frame side member.

Accordingly, some configurations may be described in duplicate.

Figure 2:
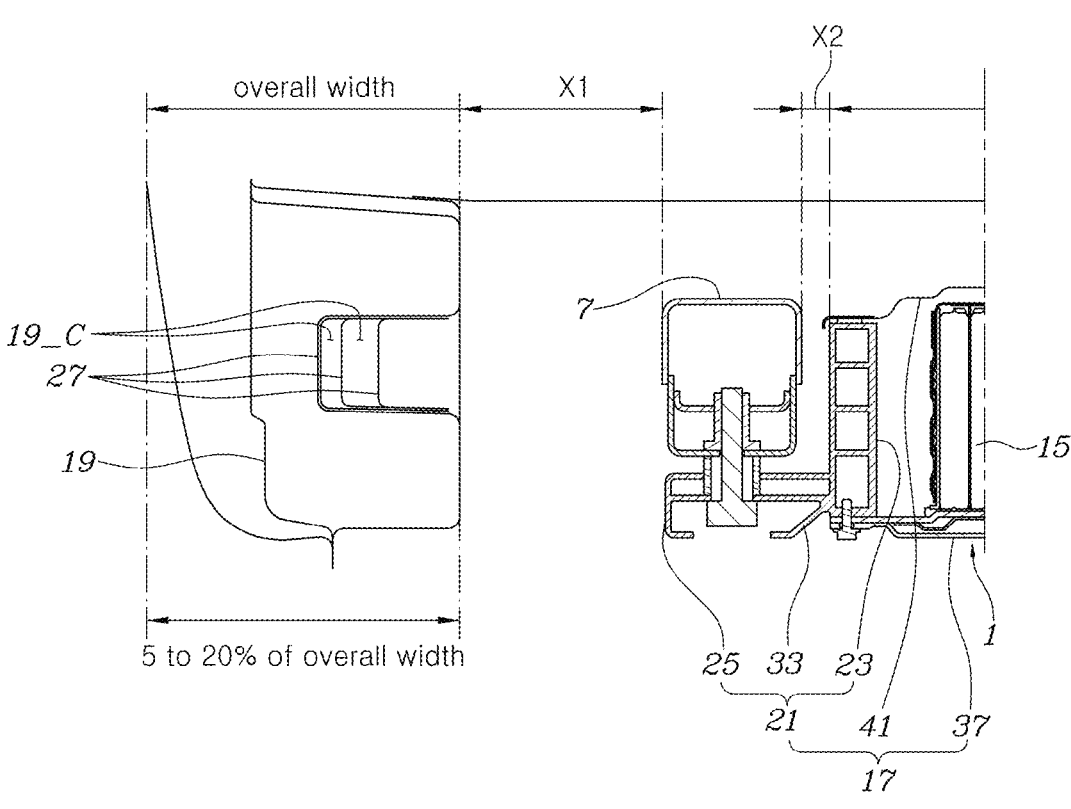

FIG. 2 mainly describes the horizontal arrangement relationship of components forming the battery pack mounting structure for the vehicle according to an exemplary embodiment of the present disclosure, and a structure of the exemplary embodiment includes a frame side member 7 forming a chassis frame 3 and disposed to extend over a long distance on both sides of a vehicle in the forward-backward direction, a battery 15 disposed to overlap inside the two frame side members 7 in a horizontal direction, a battery case 17 surrounding the battery 15 and fastened to a lower side of the frame side member 7, and a vehicle body side chamber 19 disposed to overlap in the horizontal direction outside of the frame side member 7.

That is, the battery 15 is disposed between both sides of the frame side members 7 to overlap in the horizontal direction while being surrounded by the battery case 17, the vehicle body side chamber 19 is disposed to overlap in the horizontal direction outside of the frame side member 7, as a result, the vehicle body side chamber 19, the frame side member 7, and the battery 15 are disposed to overlap each other in the horizontal direction thereof.

From the perspective of the battery 15, the vehicle body side chamber 19 and the frame side member 7 are configured to protect the battery 15 in multiple ways against impact applied horizontally from the outside of the vehicle.

The vehicle body side chamber 19 is provided to be spaced from the frame side member 7 by a vehicle body deformation section X1, which is provided to deform without contacting with the frame side member 7 during an external impact.

Furthermore, a plurality of closed cross-sections 19_C are formed to absorb shocks and suppress deformation inside the vehicle body side chamber 19 during the external impact.

Accordingly, when the external impact is applied to the vehicle, the vehicle body side chamber 19 absorbs the impact by itself while suppressing deformation for a certain amount of impact, as for the greater impact, the vehicle body side chamber 19 itself is deformed and pushed into the vehicle body deformation section X1 to absorb the impact, so that the external impact is not transmitted to the frame side member 7 and the battery 15.

To ensure impact resistance and impact absorption function as described above, a width from interior of the vehicle body side chamber 19 to an outside of the vehicle body 5 is set to 5% to 20% of a total width of the vehicle.

Furthermore, the vehicle body deformation section X1 is set to 60% or more of a width of the vehicle body side chamber 19, or is set to 40% to 60% of a distance from the vehicle body side chamber 19 to the battery 15.

That is, the vehicle body deformation section X1 needs to be set to the width of the vehicle body side chamber 19 as described above to exert a sufficient impact absorption function when the vehicle body side chamber 19 is deformed and pushed into the vehicle.

Meanwhile, the battery case 17 includes a case side unit 21 forming a side surface of the battery case 17, and the case side unit 21 includes a vertical cross-section unit 23 forming the side surface of the battery case 17 and formed long as a cross-section in a vertical direction, and a horizontal cross-section unit 25 coupled to the lower side of the frame side member 7 and vertically protruding over a long distance from the vertical cross-section unit 23 in the transverse direction of the vehicle.

Herein, the frame side member 7 is provided to be spaced from the vertical cross-section unit 23 by a frame deformation section provided to deform without contacting with the vertical cross-section unit 23 of the case side unit 21 during external impact.

That is, the case side units 21 including an 'L' shaped cross-section forms both sides of the battery case 17, and a portion protruding toward a side of the case side unit 21 is coupled to the lower side of the frame side member 7 so that a cross-section portion protruding an upper side of the case side unit 21 is horizontally spaced from the frame side member 7 by a frame deformation section X2.

Accordingly, the frame side member 7 is spaced from the vehicle body side chamber 19 by the vehicle body deformation section X1 outside the vehicle, and the frame side member 7 is spaced from the vertical cross-section unit 23 of the case side unit 21 by the frame deformation section X2 inside the vehicle.

In the frame deformation section X2, for example, the vehicle body side chamber 19 is deformed by impact applied from outside of the vehicle and transmitted to the frame side member 7, even though the frame side member 7 is also deformed, when the frame side member 7 is deformed within the frame deformation section X2, the frame deformation section X2 is configured to prevent impact from being transmitted to the battery 15.

Furthermore, the frame deformation section X2 also plays a role in facilitating assembly when the battery pack 1 is mounted to be practically coupled to the chassis frame 3.

The configuration of an exemplary embodiment of the present disclosure as described above may be expressed as follows.

That is, a battery pack mounting structure for a vehicle of the present disclosure includes a frame side member 7 elongated in the forward-backward direction on both sides of the vehicle to form a chassis frame 3, a vehicle body side chamber 19 provided to be spaced from the outside of the vehicle by a predetermined vehicle body deformation section X1 from the frame side member 7, and a battery case 17 provided with a vertical cross-section unit 23 spaced from the frame side member 7 into the vehicle by a predetermined frame deformation section X2 and embedded a battery 15 therein.

The frame side member 7 and the vehicle body side chamber 19 are disposed to overlap horizontally on both sides of the vehicle, centering on the battery case 17.

The battery case 17 includes the case side unit 21 including the vertical cross-section unit 23 forming the side surface of the battery case 17, the case side unit 21 includes a horizontal cross-section unit 25 protruding over a long distance in the transverse direction of the vehicle from a lower side of the vertical cross-section unit 23, and the horizontal cross-section unit 25 is coupled to a lower end portion of the frame side member 7.

Inside the vehicle body side chamber 19, a side chamber reinforcement panel 27 forming at least one closed cross-sections 19_C are provided to absorb impact and suppress deformation during an external impact.

Figure 3:
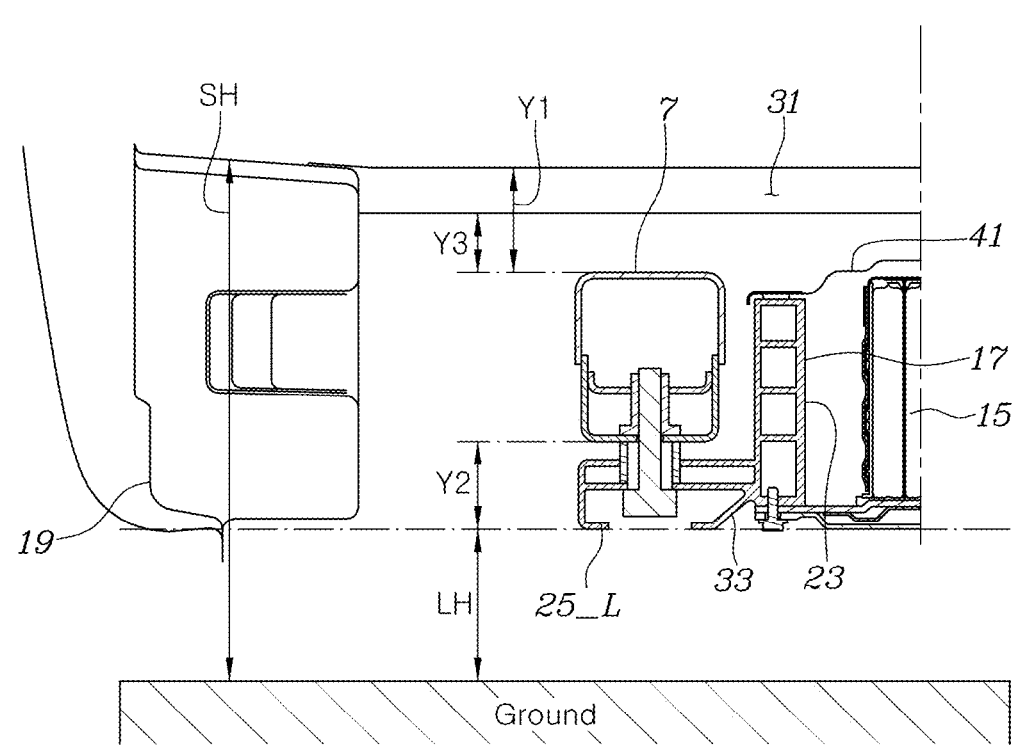

FIG. 3 mainly describes a vertical arrangement relationship of components forming the battery pack mounting structure for the vehicle according to an exemplary embodiment of the present disclosure, a structure of the exemplary embodiment includes the frame side member 7 of the chassis frame 3 provided so that an upper end portion thereof is positioned at a place spaced apart downwardly from a step height SH set in consideration of passenger ease of boarding by a predetermined reference downward interval Y1, the battery case 17 provided so that a battery 15 accommodated therein overlaps the frame side member 7 in the horizontal direction, the case side unit 21 forming the side surface of the battery case 17 and coupled to the lower side of the frame side member 7 and a lower end portion thereof is aligned with a lowest ground height LH, and a case lower plate 29 forming the battery case 17 while supporting the lower side of the battery 15 and disposed at a position spaced apart upwards from the lowest ground height LH.

Herein, the step height SH is a height of a vehicle in which a general person may board on his or her own without the help of other equipment, and is set as low as possible for easy vehicle boarding.

Furthermore, the lowest ground height LH of the vehicle is set to a minimum height that must be separated from the ground to protect a lower portion of the vehicle and a battery in consideration of the condition of the road where the vehicle mainly travels.

Herein, the frame side member 7 and the battery case 17 are disposed between the lowest ground height LH and the step height SH. The frame side member 7 is disposed at a lower side by the reference downward interval Y1 from the step height SH, and the lower end portion of the battery case 17 is aligned with the lowest ground height LH.

Herein, the reference downward interval Y1 includes a thickness of a body floor 31 whose top is aligned with the step height SH and a vehicle body gap Y3 forming between the body floor 31 and the frame side member 7.

For example, the body floor 31 is provided with a thickness of about 25 mm to provide rigidity required by the vehicle, and the vehicle body gap Y3 is set to 5 to 15 mm and may provide to play in role in avoiding interference between components generated during production and maintenance of the vehicle.

Meanwhile, the case side unit 21 forming the battery case 17 includes a vertical cross-section unit 23 forming the side surface of the battery case 17 as a cross-section elongated in the vertical direction and a horizontal cross-section unit 25 coupled to the lower side of the frame side member 7 as a cross-section vertically protruding over a long distance in the transverse direction of the vehicle from the vertical cross-section unit 23. A lower end portion 25_L of the horizontal cross-section unit 25 is aligned with the lowest ground height LH.

Because the lower end portion 25_L of the horizontal cross-section unit 25 of the case side unit 21 has a structure to horizontally be connected to an inclined connection unit 33 extending to be inclined downwardly from the lower end portion of the vertical cross-section unit 23, it may be aligned with the lowest ground height LH lower than the vertical cross-section unit 23.

Accordingly, the frame side member 7 may be provided so that the lower end portion thereof is positioned at a position where the lowest ground height LH from the ground is added to a height of the horizontal cross-section unit 25 of the case side unit 21.

The frame side member 7 is provided with a frame depressed portion 35 to which a portion where the case side unit 21 is coupled is locally depressed upward in a longitudinal direction of the vehicle.

Figure 4:
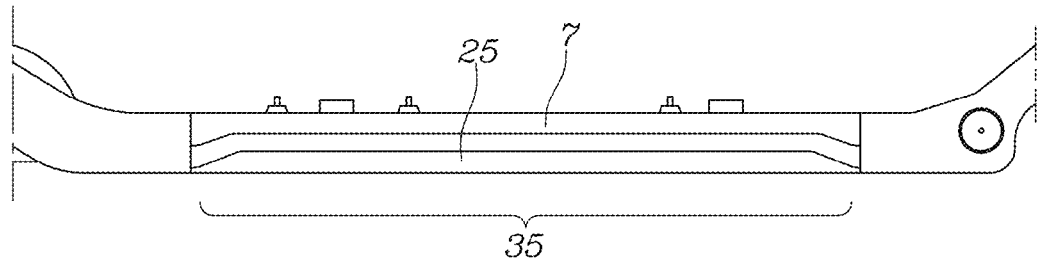

That is, as illustrated in FIG. 4, the frame side member 7 is configured so that the frame depressed portion 35 is depressed upward at the lower side thereof, and the horizontal cross-section unit 25 of the case side unit 21 is coupled to the frame depressed portion 35.

Accordingly, even though the horizontal cross-section unit 25 of the battery case 17 is coupled to the lower side of the frame side member 7, the lowest ground height LH of the vehicle does not substantially decrease.

In the configuration of the present disclosure, the battery 15 horizontally overlaps the frame side member 7 and is disposed at almost the same height, and the horizontal cross-section unit 25 of the battery case 17 is coupled to the frame depressed portion 35 of the frame side member 7, due to a structure in which the horizontal cross-section unit 25 of the battery case 17 is coupled to the frame depressed portion 35 of the frame side member 7, unnecessary space according to a vehicle mounting of the battery pack 1 is minimized. Because a distance from the lowest ground height LH to the step height SH may be minimized, due to the mounting structure of battery pack 1 for a compact vehicle, the step height SH may be ultimately lowered, ensuring ease of passenger's vehicle boarding and accommodating shapes according to various utilizes in the vehicle body coupled to the upper side of the chassis frame 3.

Meanwhile, a lower end portion of the vehicle body side chamber 19 of the vehicle body 5 provided at the upper side of the frame side member 7 is aligned with the lowest ground height LH.

That is, the vehicle body 5 is mounted on the upper side of the chassis frame 3 including the frame side member 7, and the vehicle body side chamber 19 forming a portion of the vehicle body 5 is disposed outside the frame side member 7 to be spaced apart with the vehicle body deformation section X1, and the lower end portion of the vehicle body side chamber 19 is aligned with the lowest ground height LH.

Meanwhile, the battery case 17 is provided with an undercover 37 in lower side of the case lower plate 29, the undercover 37 is aligned with the lowest ground height LH.

Accordingly, the lower end portion of the vehicle body side chamber 19, the lower end portion of the horizontal cross-section unit 25 of the case side unit 21, and the undercover 37 are all disposed to be aligned with the lowest ground height LH.

The configuration of the exemplary embodiment of the present disclosure as described above may be expressed as follows.

That is, the battery pack mounting structure for the vehicle of the present disclosure includes a frame side member 7 of a chassis frame 3 provided so that an upper end portion thereof is located at a position spaced apart downward by the predetermined reference downward interval Y1 from a step height SH of the vehicle and a lower end portion thereof is located at a position separated upward by a prescribed reference upward interval Y2 from a lowest ground height LH of the vehicle, a battery 15 disposed to overlap the frame side member 7 in the horizontal direction, and a battery case 17 mounted on the frame side member 7, surrounding the battery 15 and a lower end portion thereof aligned with the lowest ground height LH.

The battery case 17 includes a case lower plate 29 supporting a lower side of the battery 15, a cooling plate 39 provided a lower side of the case lower plate 29, the undercover 37 surrounding a lower side of the cooling plate 39, and an upper cover 41 surrounding the upper side of the battery 15, and the case side unit 21 coupled between the case lower plate 29 and the upper cover 41 and forming the side surface of the battery case 17.

The undercover 37 of the battery case 17 is aligned with the lowest ground height LH.

Furthermore, the case side unit 21 includes the vertical cross-section unit 23 formed in the shape of a long cross-section in the vertical direction between the case lower plate 29 and the upper cover 41, and the horizontal cross-section unit 25 protruding from the vertical cross-section unit 23 in the transverse direction of the vehicle.

A lower end portion of the horizontal cross-section unit 25 of the case side unit 21 has a structure of being horizontally connected to the inclined connection unit 33 formed to be inclined downwardly from the vertical cross-section unit 23, and is aligned with the lowest ground height LH.

The reference upward interval Y2 is formed with a height of the horizontal cross-section unit 25 of the case side unit 21.

Furthermore, the reference downward interval Y1 is formed by adding the thickness of a body floor 31 whose top is aligned to the step height SH and a vehicle body gap Y3 formed between the body floor 31 and the frame side member 7.

The frame side member 7 is formed long in the longitudinal direction of the vehicle, a portion at which the case side unit 21 of the battery case 17 is coupled includes the frame depressed portion 35 in which a lower side thereof is depressed upward, and a lower end portion of the case side unit 21 of the battery case 17 coupled to the frame depressed portion 35 is configured to be aligned with the lowest ground height LH.

Figure 5:
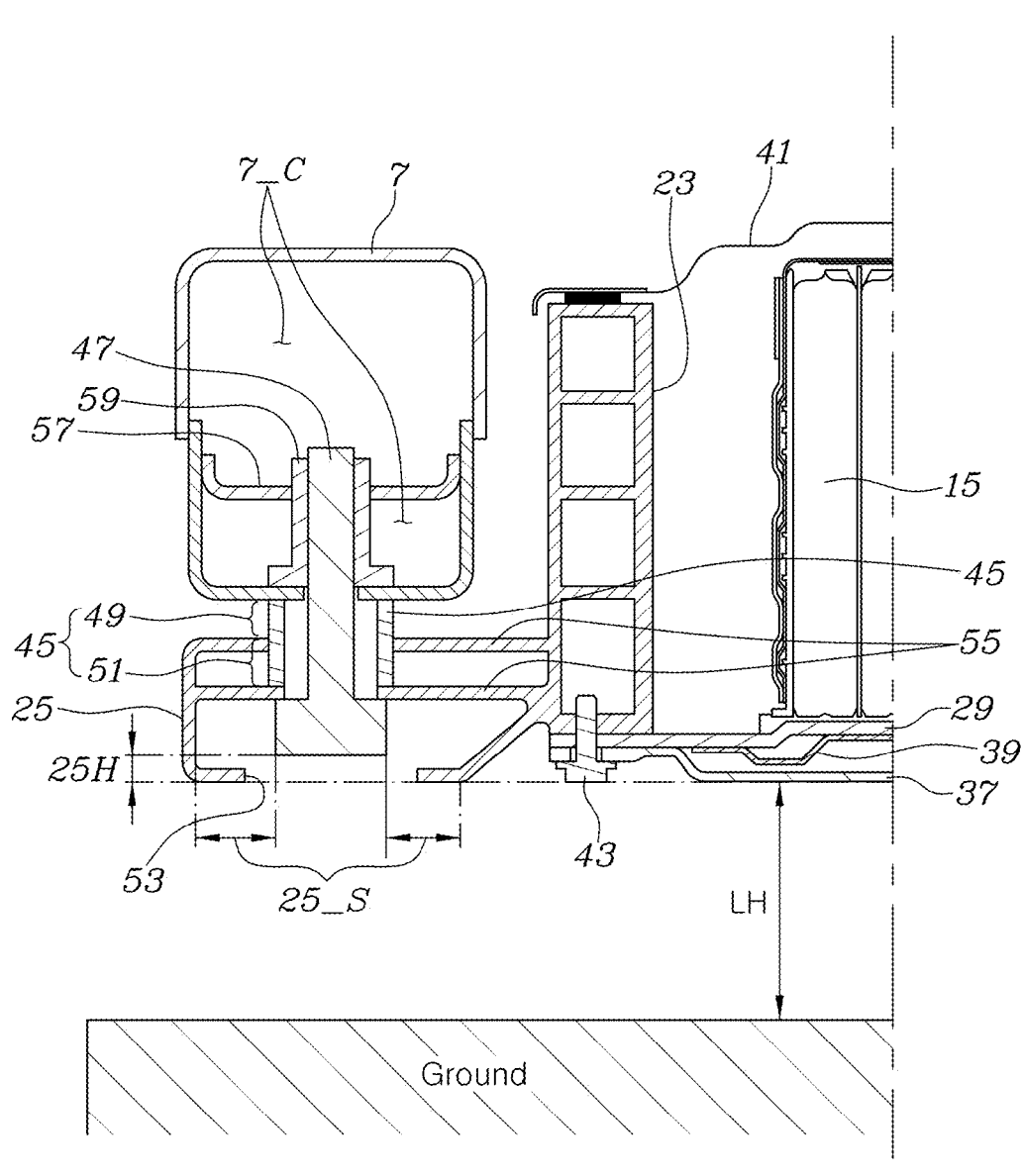

FIG. 5 mainly describes a structure of the battery case 17 forming the mounting structure of the battery pack 1 for the vehicle of the present disclosure. The structure of the exemplary embodiment includes the frame side member 7 forming the chassis frame 3 and elongated on both sides of the vehicle in the forward-backward direction, the battery 15 disposed to overlap the inside of the frame side member 7 in the horizontal direction, and the battery case 17 surrounding the battery 15. The battery case 17 is configured so that the case side unit 21 provided at a side surface thereof is coupled to the lower side of the frame side member 7.

The battery case 17 includes the upper cover 41 surrounding an upper side of the battery 15 and the case lower plate 29 supporting the lower side of the battery 15.

The case side unit 21 includes the vertical cross-section unit 23 coupled between the case lower plate 29 and the upper cover 41 and including a shape of a long cross-section in the vertical direction, and the horizontal cross-section unit 25 protruding over a long distance in the transverse direction of the vehicle from the vertical cross-section unit 23 and coupled to the lower side of the frame side member 7.

That is, the case side unit 21 is a configuration in which the horizontal cross-section unit 25 is coupled to the lower side of the frame side member 7, and the vertical cross-section unit 23 is disposed inside the frame side member 7.

Furthermore, the battery case 17 has the cooling plate 39 provided at the lower side of the case lower plate 29, the lower side of the cooling plate 39 is surrounded by the undercover 37, and the undercover 37 is aligned with the lowest ground height LH of the vehicle.

The cooling plate 39 forms a cooling path through which a refrigerant flows between the cooling plate 39 and the case lower plate 29, and circulates the refrigerant in the cooling path, making a move for cooling the battery 15 positioned at an upper side of the case lower plate 29.

Meanwhile, the undercover 37 is configured to surround and protect the lower side of the cooling plate 39.

A cover fastening bolt 43 passing through the undercover 37 and the case lower plate 29 is fastened to the vertical cross-section unit 23 of the case side unit 21, and a lower end portion of the head of the cover fastening bolt 43 is aligned with the lowest ground height LH.

That is, the case lower plate 29 and the undercover 37 are overlapped at a lower side of the vertical cross-section unit 23 of the case side unit 21 and then coupled by the cover fastening bolt 43, a portion of the undercover 37 fastened by the cover fastening bolt 43 is locally bent upward and pressed to the case lower plate 29, and the remaining portion thereof protrudes relatively downward to form a space surrounding the cooling plate 39, and thus the head of the cover fastening bolt 43 and the lower end portion of the undercover 37 may be commonly aligned with the lowest ground height LH.

The lower end portion of the horizontal cross-section unit 25 of the case side unit 21 has a structure of being horizontally connected to the inclined connection unit 33 formed to be inclined downwardly from the vertical cross-section unit 23, and is aligned with the lowest ground height LH.

That is, the horizontal cross-section unit 25 of the case side unit 21 has generally a protruded shape in the horizontal direction from the vertical cross-section unit 23, but a shape extending slightly downward at the lower side thereof is formed through the inclined connection unit 33 so that the lower end portion of the horizontal cross-section unit 25 may be configured to align with the lowest ground height LH.

Accordingly, the lower end portion of the horizontal cross-section unit 25 and the undercover 37 are aligned with the lowest ground height LH on both sides of the cover fastening bolt 43, respectively. Thus it is possible to disperse impact by avoiding intensively receiving impact only on the head of the cover fastening bolt 43 due to a protrusion or a scattering material on the lower side of the vehicle.

A sleeve 45 contacting with the lower side of the frame side member 7 is provided on the horizontal cross-section unit 25, and a case mounting bolt 47 passing through the sleeve 45 is fastened to the frame side member 7.

That is, the horizontal cross-section unit 25 of the case side unit 21 is coupled to the frame side member 7 by the case mounting bolt 47, and the case mounting bolt 47 passes through the sleeve 45 provided in the horizontal cross-section unit 25 and is fastened to the frame side member 7.

The sleeve 45 includes a protruding margin portion 49 protruding toward the upper side of the frame side member 7 and an inserting support portion 51 inserted into the horizontal cross-section unit 25, the inserting support portion 51 is supported by a plurality of support walls spaced from each other forming the horizontal cross-section unit 25.

Because the protruding margin portion 49 of the sleeve 45 may be adjusted relatively easily the length thereof by replacing the sleeve 45 or polishing an upper end portion of the sleeve 45, a height of the battery case 17 coupled to the frame side member 7 may be easily adjusted, assembly tolerance or the like of the battery case 17 may be easily absorbed.

The protruding margin portion 49 of the sleeve 45 is desirably formed of at least 7 mm, and the inserting support portion 51 of the sleeve 45 is formed of at least 15 mm.

The inserting support portion 51 of the sleeve 45 is a portion determining a coupling rigidity between the sleeve 45 and the horizontal cross-section unit 25, as described above, it is preferable to be formed to be 15 mm or more to secure a solid coupling state of the sleeve 45.

In an exemplary embodiment of the present disclosure, the lower end portion 25_L of the horizontal cross-section unit 25 is provided with a bolt through hole 53 through which a head of the case mounting bolt 47 passes, and a plurality of support walls 55 of the horizontal cross-section unit 25 supporting the sleeve 45 are formed to be parallel spaced apart upwards from the lower end portion 25_L of the horizontal cross-section unit 25.

Meanwhile, a lateral length of the horizontal cross-section unit 25 is formed so that an external end portion of the horizontal cross-section unit 25 is formed in a range that does not protrude from an external end portion of the frame side member 7 in a state where the horizontal cross-section unit 25 is coupled to the lower side of the frame side member 7 by the case mounting bolt 47.

This allows the frame side member 7 to prevent and absorb external impact before the horizontal cross-section unit 25 when external impact is applied, ultimately protecting the battery 15 accommodated in the battery case 17.

The lateral length of the horizontal cross-section unit 25 is desirably set to form a space around the head with a width of 10 to 20 mm around the head of the case mounting bolt 47, in a state where the horizontal cross-section unit 25 is coupled to the lower side of the frame side member 7 by the case mounting bolt 47.

For a bolt mounting surface of the case mounting bolt 47 to be realistically provided in the horizontal cross-section unit 25, the described level of a space around head 25_S is required when considering curvature and processing margin of the horizontal cross-section unit 25. Thus, in consideration of this, it is preferable to determine the lateral length of the horizontal cross-section unit 25.

In a state where the horizontal cross-section unit 25 is coupled to the lower side of the frame side member 7 by the case mounting bolt 47, a head margin height 25_H of 5 to 10 mm is provided between the lower end portion of the horizontal cross-section unit 25 and a head of the case mounting bolt 47.

This may effectively prevent damage to the head of the case mounting bolt 47 due to protrusions or scattering materials or the like on the road.

The head of the case mounting bolt 47 has a height of, for example, 15 to 20 mm, a diameter thereof is set to a level of 30 to 35 mm, and a number thereof is adjusted, it is preferable to sufficiently bear a load of a battery accommodated in the battery case 17.

Figure 6:
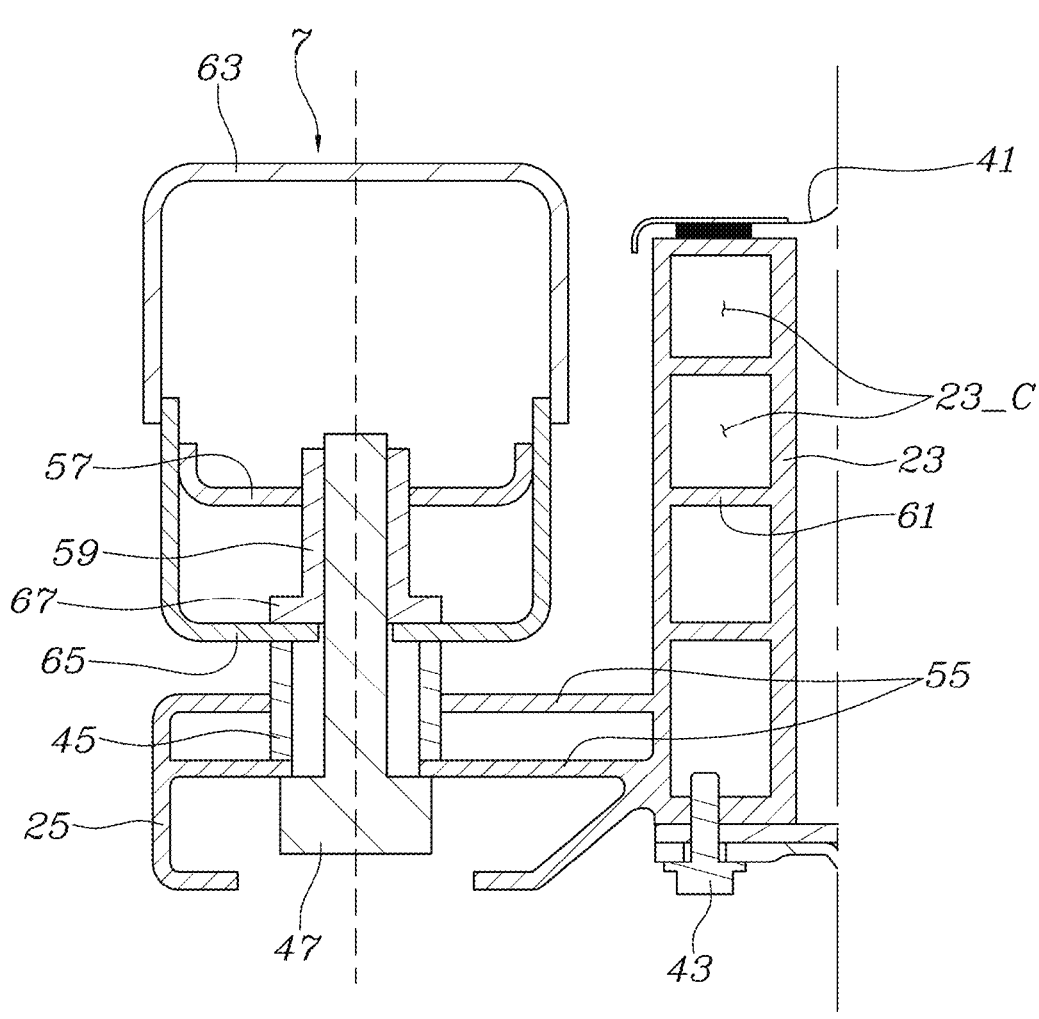

FIG. 6 mainly describes a structure of the frame side member 7 forming a battery pack mounting structure for a vehicle of the present disclosure, a structure of the exemplary embodiment includes the frame side member 7 forming the chassis frame 3 and elongated on both sides of the vehicle in the forward-backward direction, the battery 15 disposed to overlap inside of the frame side member 7 in the horizontal direction, and the battery case 17 surrounding the battery 15 and coupled to the frame side member 7, and a cross section of the frame side member 7 is configured to form a plurality of closed cross-sections 7_C.

That is, the frame side member 7 is provided with a frame reinforcement panel 57 therein to form the plurality of closed cross-sections 7_C.

Furthermore, a locker 59, to which the case mounting bolt 47 for coupling the battery case 17 to the frame side member 7 is fastened, is provided to be supported by the frame reinforcement panel 57.

The frame reinforcement panel 57 is provided in the frame side member 7 to form a bulkhead in the horizontal direction, and the locker 59 is provided in a state of passing through the frame reinforcement panel 57 to extend over a long distance vertically so that the case mounting bolt 47 fastened to pass through from the lower side of the frame side member 7 is coupled to the locker in a bolt-and-nut fastening manner.

Accordingly, the frame side member 7 has a more robust cross-section structure formed by the frame reinforcement panel 57 and the locker 59, thus it is possible to provide stronger rigidity against external impact.

The locker 59 is disposed at the center portion of a cross-section of the frame side member 7.

That is, because the frame side members 7 are symmetrically disposed on both sides of the chassis frame 3, when the locker 59 is disposed in the center portion of the cross-section of the frame side member 7 as described above, the frame side members 7 on both sides of the chassis frame 3 may be shared.

Of course, due to the structure of the vehicle, when the frame side member 7 is difficult for public use as described above, the locker 59 may be provided at a position slightly away from the center portion of the frame side member 7.

The locker 59 is provided to have a length of 9 mm or more to be screw-coupled to the case mounting bolt 47, thus it is preferable to ensure strong coupling rigidity with the case mounting bolt 47.

The battery case 17 includes the upper cover 41 surrounding the upper side of the battery 15, the case lower plate 29 supporting the lower side of the battery 15, and the case side unit 21 forming the side surface of the battery case 17 and provided between the upper cover 41 and the case lower plate 29.

The case side unit 21 includes the vertical cross-section unit 23 coupled between the case lower plate 29 and the upper cover 41 and including the shape of a long cross-section in the vertical direction, and the horizontal cross-section unit 25 protruding over a long distance in the transverse direction of the vehicle from the vertical cross-section unit 23 and coupled to the lower side of the frame side member 7.

Furthermore, the horizontal cross-section unit 25 is provided with the sleeve 45 contacting with the lower side of the frame side member 7, the case mounting bolt 47 passes through the sleeve 45 of the horizontal cross-section unit 25 and is fastened to the locker 59 of the frame side member 7.

Meanwhile, on the vertical cross-section unit 23 of the case side unit 21, a plurality of bulkheads 61 are formed to divide inside of the vertical cross-section unit 23 into a plurality of closed cross-sections 23_C.

The plurality of bulkheads 61 provided in the vertical cross-section unit 23 are spaced from each other in the vertical direction in parallel with each other, one of the bulkheads 61 is disposed to be aligned on the same horizontal plane as the frame reinforcement panel 57 of the frame side member 7.

That is, as illustrated in FIG. 6, when one of the bulkheads 61 of the vertical cross-section unit 23 is aligned on the same plane as the frame reinforcement panel 57 of the frame side member 7, when the frame side member 7 is deformed by an external impact force and is in contact with the vertical cross-section unit 23 of the case side unit 21, the bulkhead 61 aligned with the frame reinforcement panel 57 of the vertical cross-section unit 23 supports a load transmitted through the frame reinforcement panel 57, thus it is possible to effectively suppress continuous deformation of the frame side member 7.

The vehicle body side chamber 19 is disposed outside the frame side member 7, the side chamber reinforcement panel 27 is provided to form at least one closed cross-section 19_C inside the cross-section of the vehicle body side chamber 19, and at least a portion of the horizontal arrangement of the side chamber reinforcement panel 27 is disposed to be aligned on the same horizontal plane as the frame reinforcement panel 57 of the frame side member 7.

In the instant case, the frame reinforcement panel 57 of the frame side member 7 supports a load transmitted to the frame side member 7 through the side chamber reinforcement panel 27 by a deformation of the vehicle body side chamber 19, and thus it may be configured to effectively suppress continuous deformation of the vehicle body side chamber 19.

The configuration of the exemplary embodiment of the present disclosure as described above may be expressed as follows.

That is, the mounting structure of the battery pack 1 for the vehicle of the present disclosure includes the frame side member 7 disposed to extend over a long distance on both sides of the vehicle in the forward-backward direction and forming the chassis frame 3, the battery 15 disposed to overlap inside of the frame side member 7 in the horizontal direction, and the case side unit 21 coupled to the lower side of the frame side member 7 and including an "L" shaped cross-section when viewed on the side surface of the battery case 17 surrounding the battery 15.

The frame side member 7 includes a closed cross-section with an upper horizontal unit 63 and a lower horizontal unit 65 parallel to the upper and lower sides of the frame reinforcement panel 57, respectively. The lower horizontal unit 65 and the frame reinforcement panel 57 are supported with a locker 59 coupled in a bolt-and-nut manner to the case mounting bolt 47 fastened through the case side unit 21.

The locker 59 has a lower flange 67 coupled to the upper side of the lower horizontal unit 65 of the frame side member 7, and the upper side of the locker 59 is fixed by passing through the frame reinforcement panel 57.

The case side unit 21 includes the vertical cross-section unit 23 coupled to form the side surface of the battery case 17 as a long cross-section in the vertical direction, and the horizontal cross-section unit 25 protruding over a long distance in the transverse direction of the vehicle from the vertical cross-section unit 23 and coupled to the frame side member 7, between the upper cover 41 surrounding the upper side of the battery 15 and the case lower plate 29 supporting the lower side of the battery 15.

The vertical cross-section unit 23 is provided with a plurality of bulkheads 61 spaced from each other in the vertical direction, one of the bulkheads 61 is disposed to be aligned on the same horizontal plane as the frame reinforcement panel 57 of the frame side member 7.

The vehicle body side chamber 19 is disposed outside the frame side member 7, the side chamber reinforcement panel 27 is provided inside a cross-section of the vehicle body side chamber 19, and at least a portion of the horizontal arrangement of the side chamber reinforcement panel 27 is disposed to be aligned on the same horizontal plane as one of the frame reinforcement panel 57 of the frame side member 7 and one of the bulkheads 61 of the vertical cross-section unit 23.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery pack mounting structure for a vehicle, the battery pack mounting structure comprising:
   a frame side member forming a chassis frame and disposed to extend over a predetermined distance on first and second sides of a vehicle in a forward-backward direction of the vehicle;

a battery disposed to overlap inwardly from the frame side member in a horizontal direction; and a battery case surrounding the battery and coupled to the frame side member, wherein a cross-section of the frame side member forms a plurality of closed spaces, wherein the frame side member includes a frame reinforcement panel therein to form the plurality of closed spaces, wherein a locker to which a case mounting bolt for coupling the battery case to the frame side member is fastened is provided to be supported by the frame reinforcement panel, and wherein the locker is provided in a state of passing through the frame reinforcement panel.

2. The battery pack of claim 1, wherein the frame reinforcement panel is provided inside the frame side member to a bulkhead in the horizontal direction, and wherein the locker extends over a predetermined distance vertically so that the case mounting bolt fastened to pass through from a lower side of the frame side member is coupled to the locker.

3. The battery pack of claim 2, wherein the locker is disposed at a center portion of the cross-section of the frame side member.

4. The battery pack of claim 2, wherein the locker is provided so that a length of a portion thereof which is coupled to the case mounting bolt is 9 mm or more than 9 mm.

5. The battery pack of claim 2, wherein the battery case includes:

an upper cover surrounding an upper side of the battery;

a case lower plate supporting a lower side of the battery; and a case side unit provided between the upper cover and the case lower plate to form a side surface of the battery case, wherein the case side unit includes a vertical cross-section unit coupled between the case lower plate and the upper cover and including a cross-section which extends in a vertical direction, and wherein a horizontal cross-section unit protruding in a predetermined distance in a transverse direction of the vehicle from the vertical cross-section unit and coupled to the lower side of the frame side member.

6. The battery pack of claim 5, wherein the horizontal cross-section unit is provided with a sleeve contacting with the lower side of the frame side member, and wherein the case mounting bolt passes through the sleeve of the horizontal cross-section unit and is fastened to the locker of the frame side member.

7. The battery pack of claim 6, wherein the sleeve includes a protruding margin portion protruding upwards from the frame side member to provide a predetermined gap between the horizontal cross-section unit and the frame side member.

8. The battery pack of claim 5, wherein a plurality of bulkheads are formed in the vertical cross-section unit of the case side unit to divide an inside of the vertical cross-section unit into a plurality of closed spaces.

9. The battery pack of claim 8, wherein the plurality of bulkheads provided in the vertical cross-section are spaced from each other in the vertical direction and parallel to each other, and wherein one of the bulkheads is disposed to be aligned on a same horizontal plane as the frame reinforcement panel of the frame side member.

10. The battery pack of claim 9, wherein a vehicle body side chamber is disposed outside the frame side member, wherein a side chamber reinforcement panel is provided to form at least one closed space inside a cross-section of the vehicle body side chamber, and wherein at least one of portions where the side chamber reinforcement panel is horizontally disposed is aligned on the same horizontal plane as the frame reinforcement panel of the frame side member.

11. A battery pack mounting structure for a vehicle, the battery pack mounting structure comprising:

a frame side member forming a chassis frame and disposed to extend over a predetermined distance on first and second sides of a vehicle in a forward-backward direction of the vehicle;

a battery disposed to overlap inwardly from the frame side member in a horizontal direction; and a case side unit coupled to a lower side of the frame side member and including an "L" shaped cross-section when viewed on a side surface of a battery case surrounding the battery, wherein a frame reinforcement panel forming a bulkhead in the horizontal direction is provided inside the frame side member, and wherein the frame side member includes a closed cross-section with an upper horizontal unit and a lower horizontal unit parallel to an upper side and a lower side of the frame reinforcement panel, respectively, and wherein the lower horizontal unit and the frame reinforcement panel are supported with a locker coupled to a case mounting bolt fastened through the case side unit.

12. The battery pack of claim 11, wherein the locker includes a lower flange coupled to an upper side of the lower horizontal unit of the frame side member, and an upper side of the locker is fixed by passing through the frame reinforcement panel.

13. The battery pack of claim 12, wherein the locker is disposed at a center portion of the cross-section of the frame side member.

14. The battery pack of claim 12, wherein the case side unit includes:

a vertical cross-section unit between an upper cover surrounding an upper side of the battery and a case lower plate supporting a lower side of the battery, and coupled to form a side surface of the battery case as a predetermined cross-section in a vertical direction, and a horizontal cross-section unit protruding over a predetermined distance in a transverse direction of the vehicle from the vertical cross-section unit and coupled to the frame side member.

15. The battery pack of claim 14, wherein the vertical cross-section unit is provided with a plurality of bulkheads spaced from each other in the vertical direction, and one of the bulkheads is disposed to be aligned on a same horizontal plane as the frame reinforcement panel of the frame side member.

16. The battery pack of claim 14, wherein a vehicle body side chamber is disposed outside the frame side member, wherein a side chamber reinforcement panel is provided inside a cross-section of the vehicle body side chamber, and wherein at least one of portions where the side chamber reinforcement panel is horizontally disposed is aligned on a same horizontal plane as one of the frame reinforcement panel of the frame side member and the bulkhead of a vertical cross-section unit.

17. The battery pack of claim 14, wherein the horizontal cross-section unit is provided with a sleeve contacting with the lower side of the frame side member, and wherein the sleeve is provided on the horizontal cross-section unit and contacts with the lower side of the frame side member.

18. The battery pack of claim 17, wherein the sleeve includes a protruding margin portion protruding upwards from the frame side member to provide a predetermined gap between the horizontal cross-section unit and the frame side member.

\* \* \* \* \*